US008683355B1

(12) United States Patent  
Gailloux et al.

(10) Patent No.: US 8,683,355 B1
(45) Date of Patent: Mar. 25, 2014

(54) CHAT SPACE SYSTEM AND METHOD

(75) Inventors: Michael A. Gailloux, Overland Park, KS (US); Michael W. Kanemoto, Lakewood, CO (US); Jarrod A. Nichols, Olathe, KS (US); Kenneth Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1301 days.

(21) Appl. No.: 12/145,454

(22) Filed: Jun. 24, 2008

(51) Int. Cl.
*G06F 3/00* (2006.01)
*G06F 15/16* (2006.01)

(52) U.S. Cl.
USPC .......................................... 715/758; 709/204

(58) Field of Classification Search
USPC .......... 715/758, 728, 729, 751, 753; 709/204; 704/235
See application file for complete search history.

(56) References Cited

U.S. PATENT DOCUMENTS

| 7,305,438 | B2 * | 12/2007 | Christensen et al. | 709/205 |
| 7,328,242 | B1 * | 2/2008 | McCarthy et al. | 709/204 |
| 7,738,897 | B2 | 6/2010 | Tillet et al. | |
| 7,756,540 | B2 | 7/2010 | Tillet et al. | |
| 2001/0056351 | A1 * | 12/2001 | Valentine et al. | 704/270 |
| 2003/0212746 | A1 * | 11/2003 | Fitzpatrick et al. | 709/206 |
| 2005/0028418 | A1 * | 2/2005 | Pargman | 40/717 |
| 2006/0079260 | A1 | 4/2006 | Tillet et al. | |
| 2006/0184610 | A1 | 8/2006 | Izdepski et al. | |
| 2006/0184611 | A1 | 8/2006 | Izdepski et al. | |
| 2006/0184612 | A1 | 8/2006 | Izdepski et al. | |
| 2006/0184629 | A1 | 8/2006 | Izdepski et al. | |
| 2006/0184630 | A1 | 8/2006 | Izdepski et al. | |
| 2006/0184631 | A1 | 8/2006 | Izdepski et al. | |
| 2006/0184674 | A1 | 8/2006 | Izdepski et al. | |
| 2006/0184678 | A1 | 8/2006 | Izdepski et al. | |
| 2006/0184679 | A1 | 8/2006 | Izdepski et al. | |
| 2007/0033250 | A1 * | 2/2007 | Levin et al. | 709/204 |
| 2007/0078675 | A1 * | 4/2007 | Kaplan | 705/1 |
| 2007/0124484 | A1 * | 5/2007 | Pearson et al. | 709/230 |

(Continued)

OTHER PUBLICATIONS

Choksi, Ojas Thakor, Patent Application entitled "System and Method of Providing Chat Room Participation Using Dispatch Communications," filed Jul. 14, 2006, U.S. Appl. No. 11/486,770.

*Primary Examiner* — Rashawn Tillery

(57) ABSTRACT

A chat space system is provided. The chat space system comprises at least one computer system and a chat space application that when executed on at least one computer system receives a plurality of audio recordings, at least some of the audio recordings formatted to initiate one of a plurality of chat themes and the other audio recordings associated with one of the chat themes, converts a chat theme audio title contained in each of the audio recordings formatted to initiate one of the chat themes to a chat theme text title and stores the audio recordings according to chat themes. In response to receiving a request from a first device for a list of chat themes, retrieves the chat theme text titles from storage and transmits the chat theme text titles to the first device. In response to receiving a request from a second device for a summary of a first one of the chat themes, retrieves an initial portion of a selection of the audio recording formatted to initiate the first one of the chat themes and the audio recordings associated with the first chat theme from storage and transmits to the second device the initial portion of the selection of the audio recording formatted to initiate the first one of the chat themes and the audio recordings associated with the first chat theme.

20 Claims, 7 Drawing Sheets

(56) References Cited

U.S. PATENT DOCUMENTS

| | | | |
|---|---|---|---|
| 2007/0219800 A1* | 9/2007 | Hymel et al. | 704/270 |
| 2008/0039054 A1* | 2/2008 | Kim | 455/412.2 |
| 2009/0003540 A1* | 1/2009 | Zafar | 379/88.11 |
| 2009/0083389 A1* | 3/2009 | Kirkland et al. | 709/207 |
| 2009/0094329 A1* | 4/2009 | Ambati et al. | 709/204 |
| 2009/0199103 A1* | 8/2009 | Brantley et al. | 715/733 |
| 2009/0199104 A1* | 8/2009 | Pluschkell et al. | 715/733 |

* cited by examiner

FIG. 6
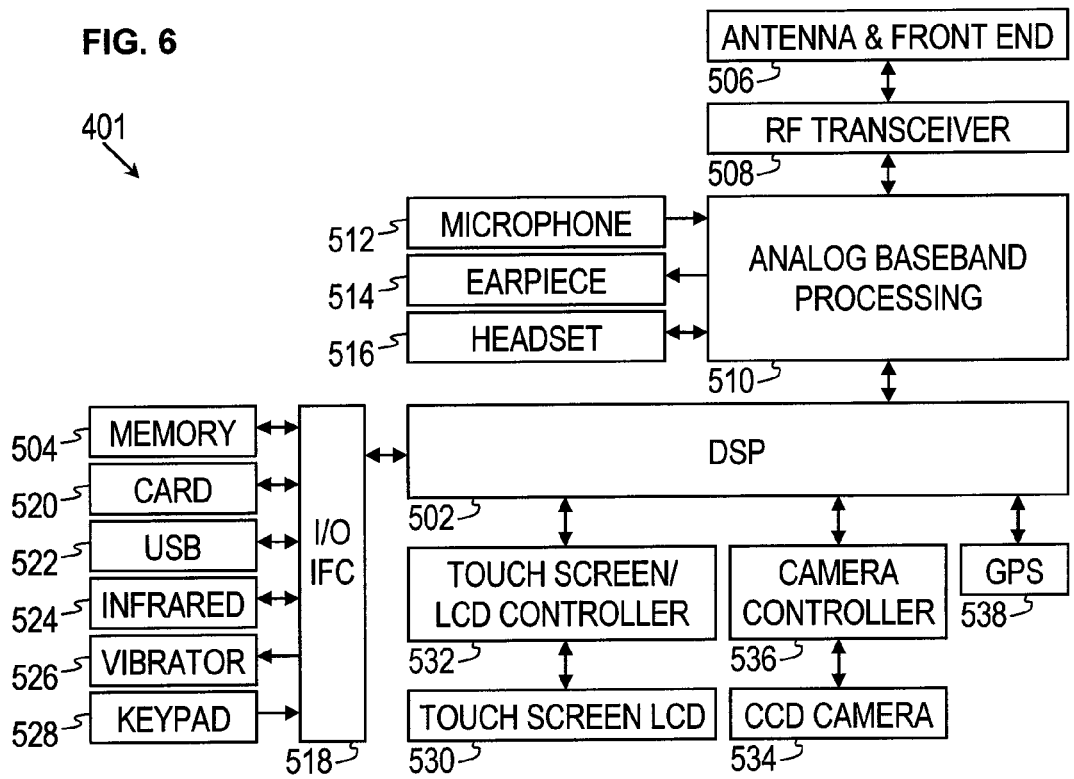
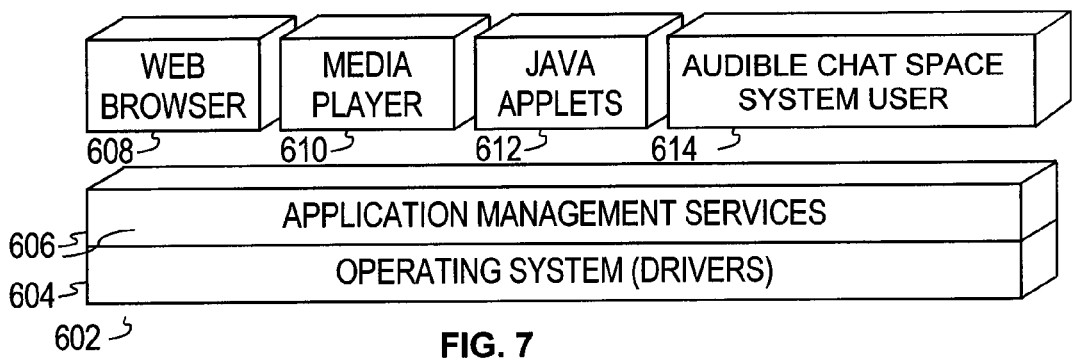
FIG. 7

CHAT SPACE SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Chat room technology traditionally allows an individual situated at a personal computer to post brief text-oriented messages for communal viewing. Participants in a chat room enter text messages at a keyboard and receive text messages at a monitor. Participants in text chat sessions may communicate synchronously in live exchanges of short text postings or asynchronously, posting messages in their own time and at their own pace. Chat rooms provide virtual congregation spaces for individuals of similar age, location, special interest or other criteria to communicate about specific topics or themes. Chat rooms originally served participants' desire to meet and conduct social networking in safe anonymity. Chat rooms evolved into threaded text exchanges in which serious interaction on a topic is facilitated. The ability to read previous entries in a discussion thread and reply at one's own pace allows a participant to absorb and think about what has previously been posted and create a more thoughtful and measured response, enhancing the value of the interaction.

SUMMARY

In an embodiment, a chat space system is provided. The chat space system comprises at least one computer system and a chat space application. When executed on at least one computer system, the chat space application receives a plurality of audio recordings, at least some of the audio recordings formatted to initiate one of a plurality of chat themes and the other audio recordings associated with one of the chat themes. The chat space application also converts a chat theme audio title contained in each of the audio recordings formatted to initiate one of the chat themes to a chat theme text title and stores the audio recordings according to chat themes. In response to receiving a request from a first device for a list of chat themes, the chat space application retrieves the chat theme text titles from storage and transmits the chat theme text titles to the first device. In response to receiving a request from a second device for a summary of a first one of the chat themes, the chat space application retrieves an initial portion of a selection of the audio recording formatted to initiate the first one of the chat themes and the audio recordings associated with the first chat theme from storage and transmits to the second device the initial portion of the selection of the audio recording formatted to initiate the first one of the chat themes and the audio recordings associated with the first chat theme.

In response to receiving a request from a first device for a list of chat themes, the chat space application transmits to the first device the chat theme text titles, and in response to receiving a request from a second device for a summary of a first one of the chat themes, the chat space application transmits to the second device an initial portion of a selection of the audio recording formatted to initiate the first one of the chat themes and the audio recordings associated with the first chat theme. In some embodiments, some of the audio recordings may be voice audio recordings. Audio recordings associated with the chat themes are received on a half duplex, single channel basis and subsequently posted to the chat theme title for listening by the first device and the second device.

In another embodiment, a method of providing an audible chat space is provided. The method comprises the chat space application receiving a plurality of voice chat messages, each of the voice chat messages including a chat title, each chat title identifying a discussion thread of the audible chat space. The chat space application discards voice chat messages that exceed a maximum file size. The chat space application stores voice chat messages that do not exceed the maximum file size. For each chat title, the chat space application determines a relevance of the chat title based on analyzing the stored voice chat messages that include the chat title. Upon entry of a first device to the audible chat space, the chat space application transmits to the first device a preview portion of the discussion threads of the audible chat space. Upon selection of a list of discussion threads by the first device, the chat space application transmits to the first device a text list of chat titles. Upon selection of a discussion thread by the first device, the chat space application transmits to the first device the stored voice chat messages having the chat title that identifies the selected discussion thread.

In another embodiment, a computer-readable medium storing a chat space program is provided that, when executed by a processor, causes the processor to receive a plurality of audio recordings, at least some of the audio recordings formatted to initiate one of a plurality of chat themes and the other audio recordings associated with one of the chat themes. The chat space program converts a chat theme audio title contained in each of the audio recordings formatted to initiate one of the chat themes to a chat theme text title. In response to receiving a request from a first device for a list of chat themes, the chat space program transmits to the first device the chat theme text titles, and in response to receiving a request from a second device for a summary of a first one of the chat themes, the chat space program transmits to the second device an initial portion of a selection of the audio recording formatted to initiate the first one of the chat themes and the audio recordings associated with the first chat theme. In an embodiment, some of the audio recordings may be voice audio recordings.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a block diagram of a mobile device according to an embodiment of the disclosure.

FIG. 7 is a block diagram of a software configuration for a mobile device according to an embodiment of the disclosure.

DETAILED DESCRIPTION

Figure 1:
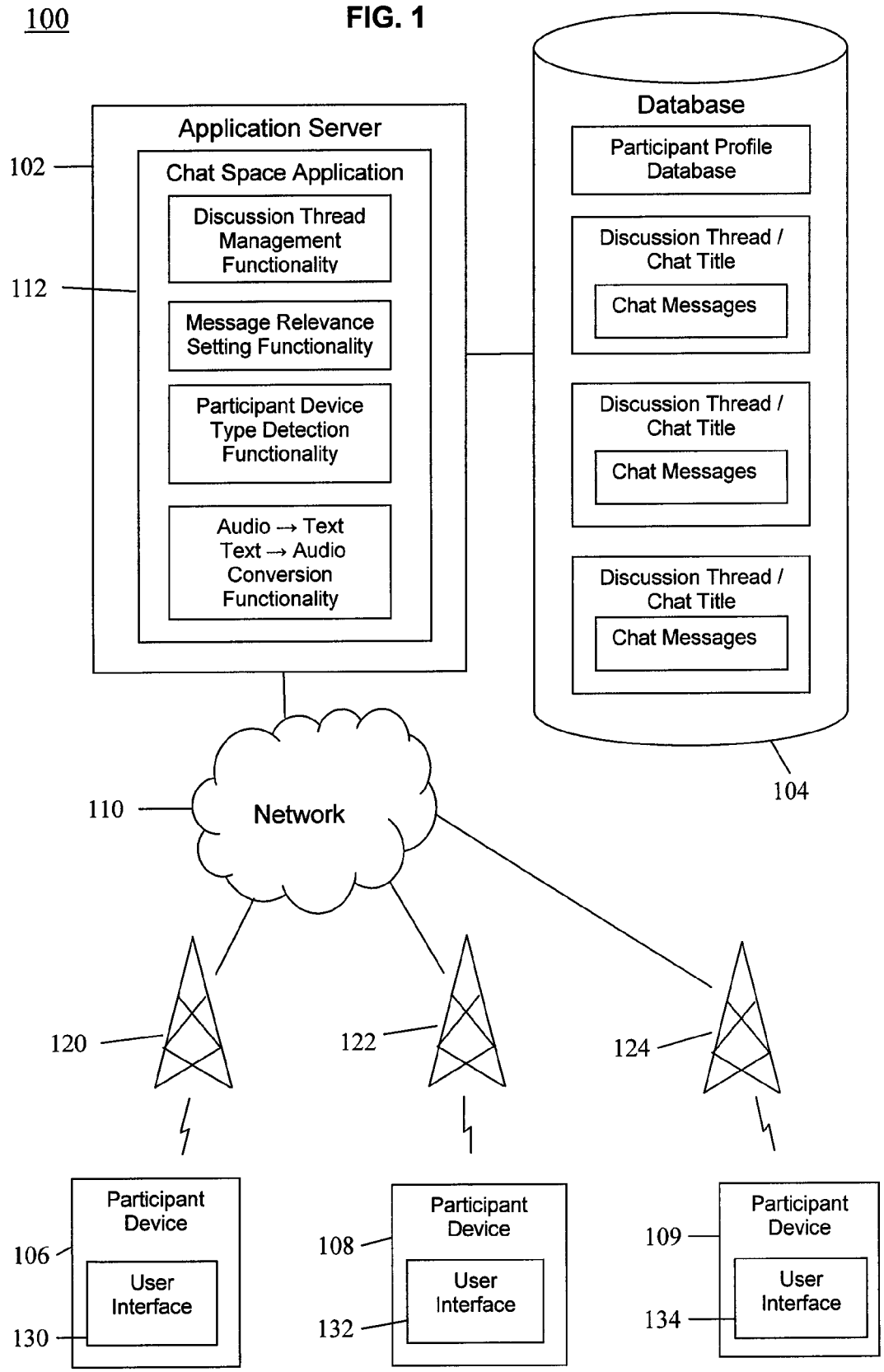
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a chat space system are taught that provide an audible chat space. In some contexts the chat space system may be referred to as an audible chat space system. Audible messages, in some contexts including voice messages, are recorded and posted to the chat space and made available for other participants to hear and respond to with their own posted audible messages should they choose. These audible messages may be referred to as audible chat messages. The chat space system includes a server responsible for receiving, organizing, and storing audible chat messages. The audible chat messages may be stored or persisted in memory on the server and/or in a database in communication with the server. Using a mobile device or other telephone, a participant connects to the chat space system and may either select a currently ongoing discussion thread on a topic of interest to the participant or may open a new discussion thread on a topic of the participant's choosing. Other participants are free to post their own audible messages to the newly opened thread or disregard the new thread and instead either continue passively listening to posted content or actively posting messages to previously opened discussion threads. Audible messages posted by participants may include voice messages. Audible messages may also include non-voice messages, for example snippets or passages of music, recordings of natural sounds, recordings of machinery sounds, recordings of events, for example crowd noise at a sporting event. As distinct from a telephone conference call, embodiments of this system may be half duplex and single channel. Messages posted to a particular thread may be played when the listening participants elect to hear a given message. Once in an existing discussion thread, participants may listen to posted messages at the time and in the order of their choice. Users may record and post messages at their own discretion. Unlike a live voice conference call, embodiments of this system permit a participant to navigate through an ongoing queue of previously posted audible recordings and selectively listen to the previously posted recordings. A participant may record and post new comments to the ongoing queue. The participant's new comments are posted in the ongoing queue and appear in the ongoing queue with the previously posted comments.

In an embodiment, a user interface on a mobile device gives each participant control over how they experience the chat space. Selected real time information may be viewable about activity levels of discussion threads including, for example, a number of current participants, an average time length of messages posted, and an average time interval between message postings. A graphical representation of this activity may be provided to some users as heat maps in which open discussion threads are represented as icons, lines or other symbols that vary in size, color or behavior (flashing, pulsating, brightness) to indicate current level or intensity of participation. Participants may scan a display of open discussion threads and hear a brief audio preview, introductory clip, or sound bite provided by the participant who opened that particular discussion thread. The introductory clip may be converted to text format and read instead of heard by the potential participant. Within a specific discussion thread, a participant may scan and hear or read brief sample portions of messages previously posted to that thread. Participants joining an ongoing thread may listen to messages posted earlier in the thread to get background on the subject before listening to current messages and making their own audible postings. Participants may also conduct searches for discussion topics. Participants may search for postings within a given topic by one or more specific participants. Additional functionality allows the participant who opened a discussion thread to give priority to certain other participants of their choosing or to block a participant who violates rules or posts excessively.

Turning to FIG. 1, a system 100 for providing a chat space is described. The system 100 comprises an application server 102, a chat space application 112, a database 104, a network 110, a first wireless base station 120, and a first participant device 106. In an embodiment, the system 100 may comprise additional participant devices including a second participant device 108 and a third participant device 109 and additional wireless base stations including a second wireless base station 122 and a third wireless base station 124. In some contexts, the chat space may be referred to as an audible chat space.

The application server 102 may be any general purpose computer system, as discussed in greater detail hereinafter. The application server 102 may comprise one computer or a plurality of computers, for example a server farm wherein many server computers cooperate to share a processing load. The application server 102 may comprise a plurality of computers which are located at different places, for example to provide geographical diversity and increased service reliability. The application server 102 executes one or more applications that provide services to one or more of the participant devices 106, 108, 109 including hosting of the chat space application 112.

The chat space application 112 resides on the application server 102 and receives audible chat messages sent by the participant devices 106, 108, 109. Some of the audible chat messages initiate new discussion threads and other audible chat messages are posted to discussion threads. The chat space application 112 converts an audio title contained in each audible chat message that initiates new discussion threads to a text title that can be displayed as a headline. The chat space application 112 provides a text list of discussion threads to participants when they request it. When the participant device 106, 108, 109 requests a summary of a selected discussion thread, the chat space application 112 may send a portion of the original audible chat message submitted to initiate the selected discussion thread as well as some or all subsequent audible chat messages posted to the selected discussion thread. The chat space application 112 may rank discussion threads based on the number of audible chat messages posted to each discussion thread, the frequency of audible chat messages posted to each discussion thread over a time interval, and the average length of messages posted to each discussion thread. The chat space application 112 may delete discussion threads when interest in a thread drops below a threshold. In an embodiment, the chat space application 112 may delete audible chat messages which exceed a threshold size.

The chat space application 112 promotes converting audible chat messages, for example voice audible chat messages, to text and vice versa. In an embodiment, the chat space application 112 promotes participants in a discussion thread separating themselves from the discussion thread to form their own private audible chat session.

The database 104 stores and makes information available to the application server 102 and possibly other server computers that may execute applications unrelated to the system 100. The information stored and made available by the database 104 may include profile information on each participant of the chat space. Profile information for participants may comprise participants' account information, identifying information about the participant devices 106, 108, 109 including the devices' technical capabilities and equipment serial numbers, the participants' selected user interface(s), participants' preferences regarding chat subject matter and historical data about participants' activity. Individual participants may have more than one profile, each of which a participant may use for a different type of chat space activity, for example professional, social, and personal. The database 104 also hosts the computer files specific to each discussion thread comprising the audible chat messages posted for the discussion threads. The database 104 may comprise multiple separate databases, for example a first database containing profile information for participants and their participant devices and a second database containing computer files specific to each discussion thread. The database 104 may be implemented in a variety of manners known to those skilled in the art, including as a relational database, as an object-oriented database or according to some other data storage/access principles.

While the database 104 is shown in FIG. 1 as containing discussion threads which in turn contain the audible chat messages posted to the discussion threads, it should be noted that this is an abstract representation of how the chat space application 112 groups audible chat messages and discussion thread folders and files. The chat space application 112 may group audible chat messages using a file system unrelated to discussion thread designations. Audible chat messages may be flagged or marked with pointers so that the entry into a specific discussion thread by the participant device 106, 108, 109 triggers the locating of audible chat message files linked to the chosen discussion thread.

The participant devices 106, 108, 109 are associated with participants who wish to create new discussion threads, post audible chat messages to ongoing discussion threads and hear audible chat messages posted by other participants to ongoing discussion threads of the system 100. Participant devices 106, 108, 109 may be mobile phones, telephones or other electronic devices equipped with a user interface 130, 132, 134. These devices have the capability to connect with the chat space application 112, listen to audible chat messages and record and post audible chat messages. These devices also allow participants to navigate within and make selections using the user interface 130, 132, 134 on the participant devices 106, 108, 109. In an embodiment, the participant listens to posted audible chat messages using a mobile phone and records and posts audible chat messages when ready using Push-to-talk (PTT), a method of conversing on half-duplex communication lines using a momentary button to switch from voice reception mode to transmit mode.

Participants employ the user interfaces 130, 132, 134 displayed on the participant devices 106, 108, 109 to interact with other participants and view real time data about ongoing discussion threads and the relevance and ranking of threads. The sophistication and availability of features on the user interface 130, 132, 134 may be determined based on the technical capabilities of the participant device 106, 108, 109. The chat space application 112 has the ability to sense the type of the first participant device 106 when the device initiates contact with the application server 102 to begin an audible chat session. The chat space application 112 presents menu choices and other graphical representations in a user interface that is appropriate for the technical capabilities of the first participant device 106 and the specifics of the participant's account with a provider of the audible chat space.

While described and illustrated as communicating with the chat space application 112 via the network 110 and the first wireless base station 120, in an embodiment, the first participant device 106 may roam into the coverage area of a different wireless base station and communicate with the network 110 through that different base station. The first participant device 106 may communicate with the network 110 via the second wireless base station 122 or the third wireless base station 124, for example when the participant device 106 roams into the coverage area of those wireless base stations. Likewise, the second participant device 108 may communicate via the first wireless base station 120 or the third wireless base station 124 and the third participant device 109 may communicate via the first wireless base station 120 or the second wireless base station 122 should either participant device roam into the coverage areas of those wireless base stations.

The network 110 provides communication between the application server 102 and the participant devices 106, 108, 109. The participant devices 106, 108, 109 make requests across the network 110 to the application server 102 for access to the chat space application 112 and associated database files on the database 104. The network 110 may be any communication network including a public data network (PDN), a public switched telephone network (PSTN), a private network, and/or a combination thereof. The network 110 may provide a variety of communication services or forms of communication including email communication, simple message service (SMS) message communication, text message communication, voice traffic communication, web content communication, and other communication services and communication content.

The first, second, and third wireless base stations 120, 122, 124 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; or other wireless access device. The first, second, and third wireless base stations 120, 122, 124 are in communication with the network 110, for example via wired communication links.

The application server 102 has communications connectivity to the network 110 and via the network 110 has connectivity to the first participant device 106 via the first wireless base station 120, to the second participant device 108 via the second wireless base station 122, and to the third participant device 109 via the second wireless base station 124. If a participant device roams into the coverage area of a different wireless base station, the application server 102 would communicate with the subject participant device via the network 110 and the wireless base station in the particular coverage area into which the subject participant device has roamed.

Figure 2:
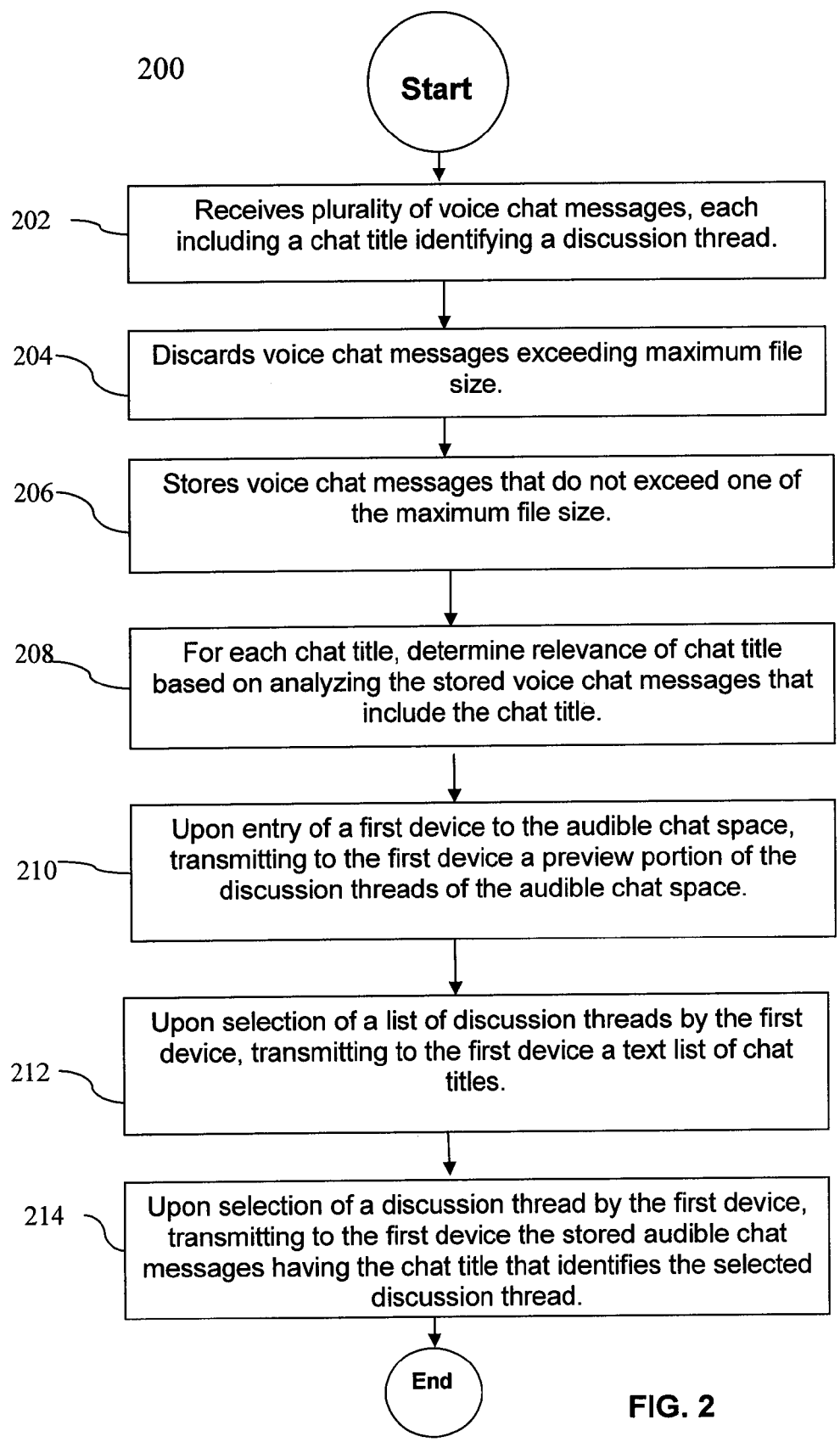
FIG. 2 is a flowchart illustrating a method according to an embodiment of the disclosure.

Turning to FIG. 2, a method 200 for an audible chat space system will be discussed. The method begins at block 202.

The chat space application 112 receives voice chat messages from the participant device 106. Each voice chat message includes a chat title which indicates to the chat space application 112 the particular discussion thread to which the participant device 106, 108, 109 wishes its voice chat message posted. If the chat space application 112 receives a request from a participant device 106, 108, 109 including at least one keyword, the chat space application 112 searches its listing of currently open discussion threads for titles that include the keyword(s) and returns a list of matching discussion threads to participant device 106, 108, 109.

At block 204, the chat space application 112 may discard voice chat messages that exceed a maximum file size. Alternatively, the chat space application 112 may truncate but retain voice chat messages when they reach a limit. At block 206, the chat space application 112 stores voice chat messages that do not exceed a maximum file size. The chat space application 112 posts these voice chat messages to the particular discussion thread identified in the chat title of each voice chat message.

At block 208, the chat space application 112 examines the chat title of each voice chat message received and determines the relevance or popularity of the ongoing discussion thread associated with the chat title. Relevance of a discussion thread is measured in terms of levels of activity for the discussion thread, for example a number of participants currently in a discussion thread, a number of voice chat messages posted to the thread in the last minute, hour, day or other period, time length of messages, or a time interval between posted messages. Measures of relevance are used to rank or group discussion threads for participants as participants make choices about ongoing discussion threads they may join or new discussion threads they may initiate.

At block 210, when the first participant device 106 enters the audible chat space, the first participant device 106 may desire to join a currently ongoing discussion thread. The system provides a method for transmitting a preview portion of the currently ongoing discussion threads that the first participant device 106 may join to the first participant device 106. This preview may consist of an audible introductory portion of the audible chat message recorded by the participant who initiated a certain discussion thread. The preview may be limited to about ten seconds in length. The preview may alternatively be the same introductory message converted to readable text which is displayed briefly in a small popup window on the participant's user interface 130.

At block 212, when the first participant device 106 selects a list of discussion threads that may be of interest, the chat space application 112 transmits to the first participant device 106 a text list of chat titles corresponding to each discussion thread on the list of discussion threads selected by first participant device 106. The text list of chat titles may be ranked by one or more measures of relevance and this ranking may be subject to the preferences of the participant using first participant device 106.

At block 214, when the first participant device 106 chooses a discussion thread it wishes to join from the list of chat titles transmitted to it at block 212 and transmits its selection to the chat space application 112, the chat space application 112 transmits back to the first participant device 106 a list of the voice chat messages that have been previously posted to the discussion thread chosen by first participant device 106. The previously posted voice chat messages will display identifying information such as the name of the participant who posted the message, the day and time it was posted, and the length of the message. The first participant device 106 may then listen to any or all of the previously posted messages in full or in part and in the order of the participant's choosing. The first participant device 106 may also record and post messages to the discussion thread. The first participant device 106 may also exit the discussion thread at the discretion of the participant.

In an embodiment, when the first participant device 106 chooses a discussion thread, the first participant device 106 or chat space application 112 may have functionality permitting the first participant device 106 to begin with the earliest voice chat message posted to the discussion thread and advance or skip forward through the list and proceed chronologically toward the more recently posted voice chat messages. Alternatively, functionality may permit the first participant device 106 to begin its progression through the list near the most current voice chat message with the first participant device 106 having the option to move forward or backward through the chronological list of voice chat messages. Alternatively, functionality may permit the first participant device 106 to begin at a configurable quantity or time behind the most recently posted voice chat message, for example three voice chat messages prior to the most current voice chat message posted or three minutes prior to the posting of the most current voice chat message. The first participant 106 may then be able to become quickly familiar with the most currently posted voice chat messages without requiring careful selection of voice chat messages. Each of these alternatives may allow the first participant device 106 to accommodate a smaller user interface 130.

The participant using first participant device 106 makes choices and otherwise experiences the audible chat space primarily through the first user interface 130 displayed on the first participant device 106. The first user interface 130 graphically represents the choices available on the display of the first participant device 106. In an embodiment, the first participant device 106 may have the flexibility of structuring the first user interface 130 to suit its preferences in terms of how ongoing discussion threads and individual audible chat messages posted to ongoing discussion threads are grouped and displayed. Participants may choose to group available discussion threads by topic, by duration of ongoing discussion threads or by the occurrence of postings by certain other participants. Discussion threads and audible chat messages posted to specific threads may be displayed in text listings or graphical representations such as lines or icons in a heat map which could exhibit behavior indicating activity level. Because of limited display space, listings or graphical representation such as a heat map might be able to display only a portion of a participant's choices, such as the ten longest running discussion threads or just discussion threads on a specific subject.

Figure 3:
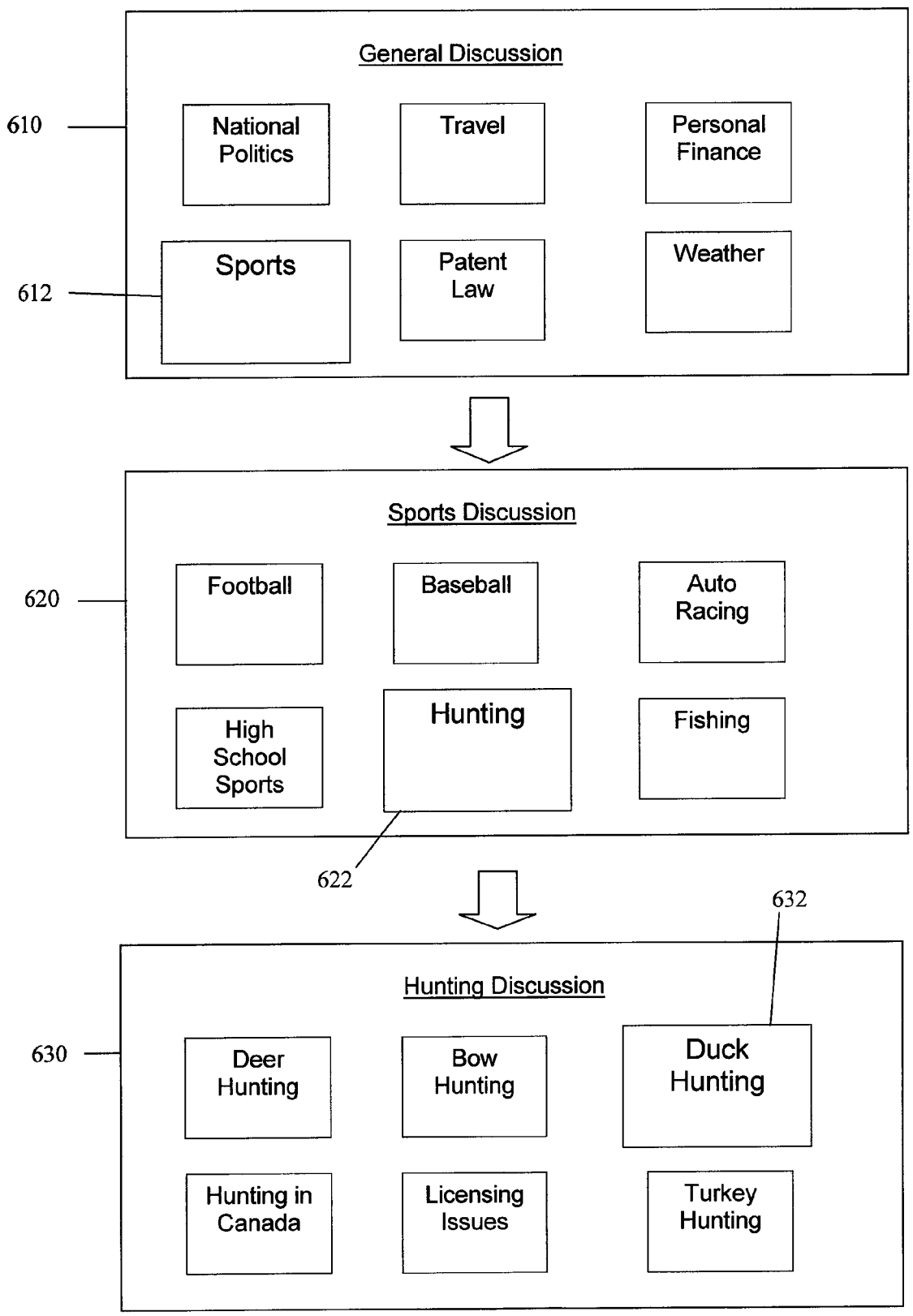
FIG. 3 is a diagram illustrating another method according to an embodiment of the disclosure.

Turning to FIG. 3, an embodiment of the user interface 130, 132, 134 is discussed. The figure depicts three successive views of user interface 130, 132, 134 as a participant moves from block 610 to block 620 to block 630 in deciding on a discussion thread the participant may eventually join. The three views depict successive heat map interfaces with the subject area blocks inside of block 610, 620, 630 representing icons or symbols which exhibit behavior indicating a notable level of discussion thread activity within the particular subject area. In this embodiment, the participant enters the audible chat space and may be interested in which of the participant's preferred subject areas and discussion threads are active. Starting at block 610, the first heat map or subject display the participant sees upon entry, the participant sees that block 612, representing the general sports area of discussion activity, is both larger in size and displaying a font size than is larger than the other icons or symbols in that view, indicating that discussion thread activity is high within that subject area. The participant chooses block 612 whereupon block 620 is displayed depicting available subject area choices within the general sports area. Within block 620 is block 622 which covers the hunting subject area. Block 622 in the embodiment is both larger in size and displaying a larger font than the other icons or symbols in that view, indicating that discussion thread activity is high within the hunting subject area. Curious about what types of hunting discussion activity is taking place, the participant chooses block 622 and block 630 for hunting subjects is then displayed. Within block 630 is block 632 which is both larger in size and displaying a larger font than the other icons or symbols in that view, indicating that discussion thread activity is high within the duck hunting subject area. The participant may then decide he wishes to see what duck hunting discussion threads are particularly active and he chooses block 632. At that point a text or graphical listing or display might appear showing some all of duck hunting discussion threads. The participant can then enter one of the listed discussion threads and listen to previously posted audible chat messages and record and post the participant's own audible chat messages. In the embodiment, blocks 612, 622, 632 are icons or symbols visually exhibiting behavior indicating current discussion thread activity within. The participant device 106, 108, 109 used by the participant in this example may have technical capabilities such that the user interface 130, 132, 134 may be able to exhibit its icons or symbols varying in brightness, flashing or pulsating speed, or periodicity to alert the participant that there is a new or particularly active discussion thread under that subject heading.

In an embodiment, the participant might merely position the participant's cursor or pointer over an icon or symbol which after a momentary delay might display in a cascading fashion the submenus below it with those submenus currently containing active discussion threads graphically exhibiting behavior indicating their activity. In the embodiment, the participant has the freedom to create a menu structure and corresponding heat map display in a manner of the participant's choosing, provided the participant device 106, 108, 109 has the necessary technical capabilities. As the user interface 130, 132, 134 is limited in physical display size, the participant may not be able to see all of the participant's icons, symbols or other menu items all together at once. In an embodiment, the participant may scroll through a much larger display of items than can be displayed concurrently on the user interface 130, 132, 134. The participant can also use the chat space system's search function to locate a specific category or discussion thread without lengthy scrolling.

Because audible chat messages are posted to a discussion thread and saved there instead of played immediately for those present and then permanently lost, the first participant device 106 always has the option to choose which posted audible chat messages the first participant device 106 hears. When joining an ongoing discussion thread, the first participant device 106 may selectively listen to postings earlier in the discussion thread to get background information on what is being currently discussed. The first participant device 106 retains the option to hear and discard all audible messages immediately as they are posted.

Figure 4:
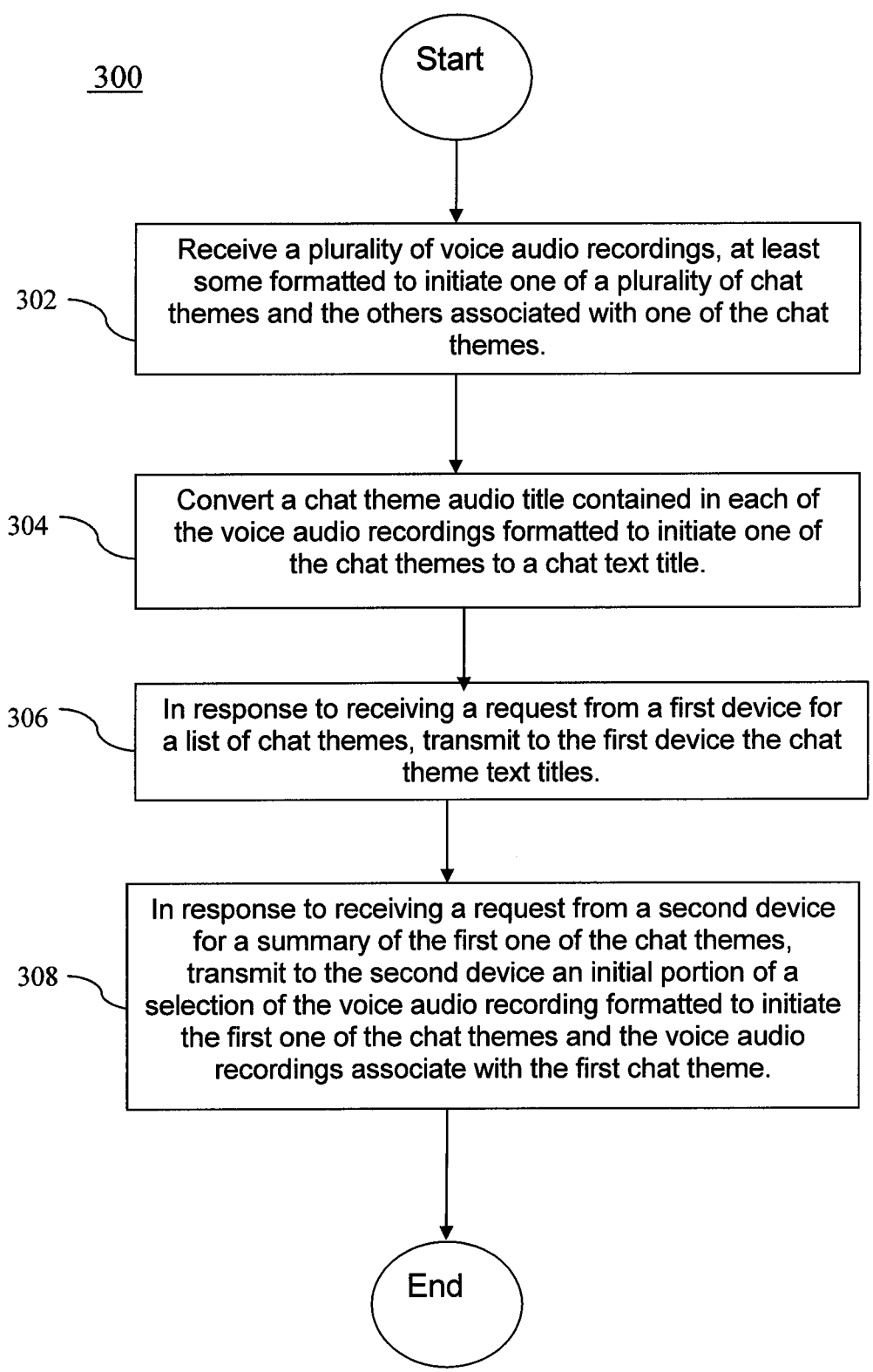
FIG. 4 is a flowchart illustrating another method according to an embodiment of the disclosure.

Turning now to FIG. 4, another method 300 for an audible chat space is discussed. Starting in block 302, the chat space application 112 receives a plurality of voice audio recordings. Some recordings are audible chat messages from participants intended to be posted to ongoing discussion threads as discussed above. Other recordings are audible chat messages from participants seeking to initiate or open a new discussion thread on a subject of the participant's choosing. The first participant device 106 wishing to open a new discussion thread indicates so either by voice or by manual entry on the first user interface 130. The participant is able to speak into the first participant device 106 the participant's chosen chat theme audio title which is sent to the chat space application 112. In some cases the audio recordings may be voice recordings, but in other cases other types of audio may be recorded.

In block 304, the chat space application 112 converts the new chat theme audio title designated by participant device 106 into a chat text title. The chat text title becomes the name of the new discussion thread and is added to the list of ongoing discussion threads available to participant devices.

In block 306, in response to receiving a request from the first participant device 106 for a listing of currently available chat theme text titles, the chat space application 112 transmits to participant device 106 a list of the chat theme text titles.

In block 308, the second participant device 108 sends a request to the chat space application 112 for a specific chat theme or discussion thread. The chat space application 112 in response transmits to the second participant device 108 an initial or preview portion of the audible chat message created by the participant who opened the discussion thread chosen by the second participant device 108. The chat space application 112 also transmits to the second participant device 108 the audible chat messages previously posted for the specific chat theme or discussion thread chosen by the second participant device 108.

The chat space application 112 includes functionality which allows it to grant privileges to the participant devices 106, 108, 109 that initiate a new discussion thread. The initiating participant device 106, 108, 109 is given the authority to grant priority to certain other participants and bar specific other participating devices from the subject discussion thread for any reason. Reasons for barring a specific participant include the participant posting an excessive number of audible chat messages to the discussion thread or posting audible chat messages which include offensive, obscene, or hateful content.

Figure 5:
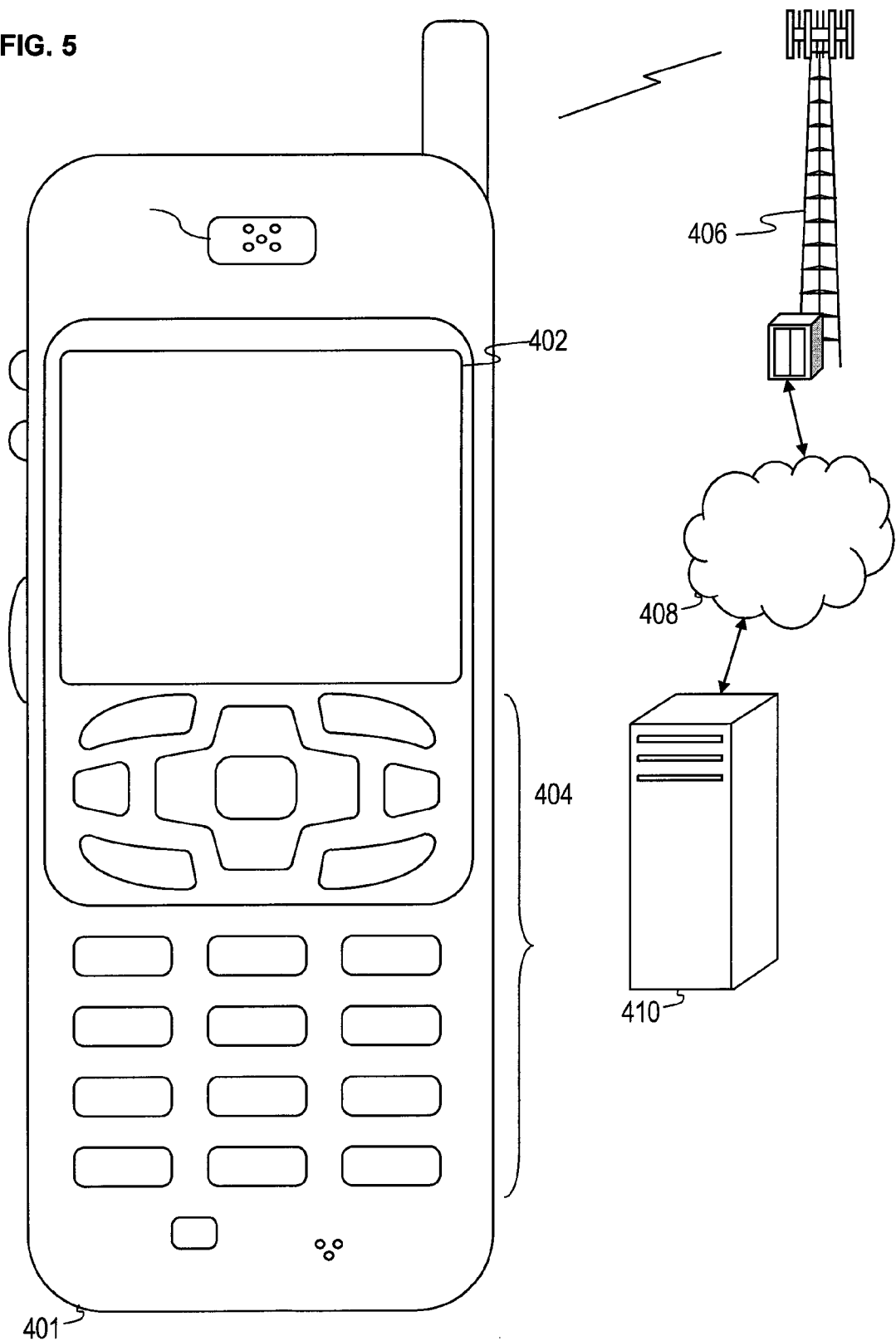
FIG. 5 is an illustration of a mobile device according to an embodiment of the disclosure.

FIG. 5 shows a wireless communications system including the handset 401. FIG. 5 depicts the handset 401, which is operable for implementing aspects of the present disclosure, but the present disclosure should not be limited to these implementations. For example, in an embodiment the handset 401 may be used to implement the participant devices 106, 108, 109. Though illustrated as a mobile phone, the handset 401 may take various forms including a wireless handset, a personal digital assistant (PDA), a portable computer, a tablet computer, or a laptop computer. Many suitable handsets combine some or all of these functions. In some embodiments of the present disclosure, the handset 401 is not a general purpose computing device like a portable, laptop or tablet computer, but rather is a special-purpose communications device such as a mobile phone, wireless handset, or PDA. The handset 401 may support specialized activities such as gaming, inventory control, job control, and/or task management functions, and so on.

The handset 401 includes a display 402 and a touch-sensitive surface or keys 404 for input by a user. The display 402 presents the user interface 130, 132, 134 to the participant. The handset 401 may present options for the user to select, controls for the user to actuate, and/or cursors or other indicators for the user to direct. The handset 401 may further accept data entry from the user, including numbers to dial or various parameter values for configuring the operation of the handset. The handset 401 may further execute one or more software or firmware applications in response to user commands. These applications may configure the handset 401 to perform various customized functions in response to user interaction. Additionally, the handset 401 may be programmed and/or configured over-the-air, for example from a wireless base station, a wireless access point, or a peer handset 401.

The handset 401 may execute a web browser application which enables the display 402 to show a web page. The web page may be obtained via wireless communications with a cell tower 406, a wireless network access node, a peer handset 401 or any other wireless communication network or system. The cell tower 406 (or wireless network access node) is coupled to a wired network 408, such as the Internet. Via the wireless link and the wired network, the handset 401 has access to information on various servers, such as a server 410. The server 410 may provide content that may be shown on the display 402. Alternately, the handset 401 may access the cell tower 406 through a peer handset 401 acting as an intermediary, in a relay type or hop type of connection.

FIG. 6 shows a block diagram of the handset 401. While a variety of known components of handsets 401 are depicted, in an embodiment a subset of the listed components and/or additional components not listed may be included in the handset 401. The handset 401 includes a digital signal processor (DSP) 502 and a memory 504. As shown, the handset 401 may further include an antenna and front end unit 506, a radio frequency (RE) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 401 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 401 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 401 to send and receive information from a cellular network or some other available wireless communications network or from a peer handset 401. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RE power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 401 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 401 to function as a peripheral device to exchange information with a personal computer or other computer system. The infrared port 524 and other optional ports such as a Bluetooth interface or an IEEE 802.11 compliant wireless interface may enable the handset 401 to communicate wirelessly with other nearby handsets and/or wireless base stations.

The input/output interface 518 may further connect the DSP 502 to the vibrator 526 that, when triggered, causes the handset 401 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 401. Another input mechanism may be the touch screen LCD 530, which may also display text and/or graphics to the user. The touch screen LCD controller 532 couples the DSP 502 to the touch screen LCD 530.

The CCD camera 534 enables the handset 401 to take digital pictures. The DSP 502 communicates with the CCD camera 534 via the camera controller 536. The GPS sensor 538 is coupled to the DSP 502 to decode global positioning system signals, thereby enabling the handset 401 to determine its position. In another embodiment, a camera operating according to a technology other than charge coupled device cameras may be employed. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 401. Also shown in FIG. 7 are a web browser application 608, a media player application 610, and JAVA applets 612. The web browser application 608 configures the handset 401 to operate as a web browser, allowing a user to enter information into forms and select links to retrieve and view web pages. The media player application 610 configures the handset 401 to retrieve and play audio or audiovisual media. The JAVA applets 612 configure the handset 401 to provide games, utilities, and other functionality. The audible chat space system user interface 614 is software installed on the handset 401 that permits functionality of the user interface 130, 132, 134.

Figure 8:
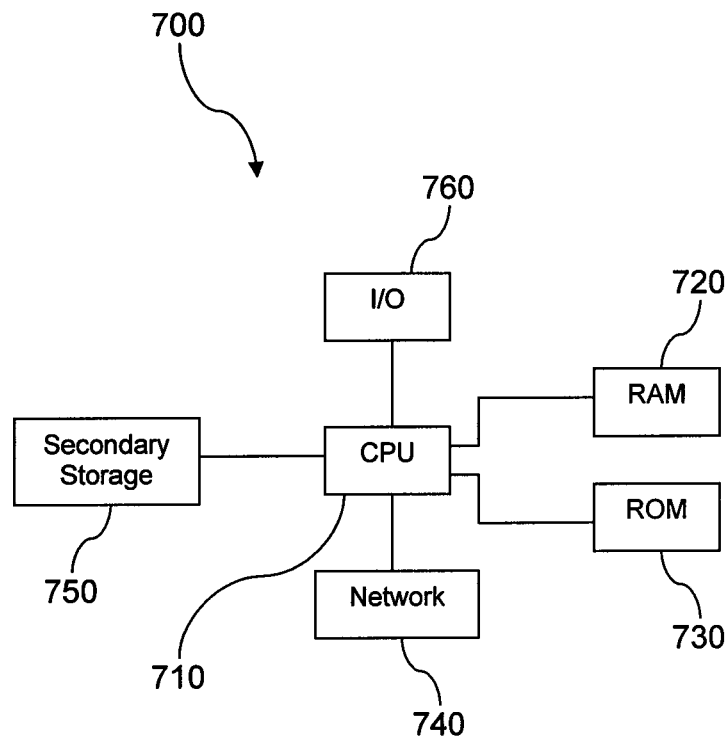
FIG. 8 illustrates an exemplary general purpose computer system suitable for implementing some aspects of the several embodiments of the disclosure.

Aspects of the system 100 described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor may be implemented as one or more CPU chips.

The secondary storage 750 is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 740 may enable the processor 740 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 710 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A chat space system, comprising:
   at least one computer system; and
   an audible chat space application for managing an audible chat space hosted on the at least one computer system that, when executed on the at least one computer system,
      receives a plurality of audio recordings, at least some of the audio recordings formatted to initiate one of a plurality of chat themes and the other audio recordings associated with one of the chat themes,
      posts the plurality of audio recordings to the audible chat space;
      converts a chat theme audio title provided for each of the audio recordings formatted to initiate one of the chat themes to a chat theme text title,
      stores the audio recordings according to chat themes,
      enables navigation of the chat themes by displaying a separate icon for each of the chat themes, signaling an activity level for each of the chat themes based on adjustable icon attributes, and presenting audio recordings posted for a chat theme in response to selection of a corresponding icon by a user,
      in response to receiving a request from a first device for a list of chat themes, retrieves the chat theme text titles from storage and transmits the chat theme text titles to the first device, and
      in response to receiving a request from a second device for a summary of a first one of the chat themes, retrieves a sample portion of the audio recording formatted to initiate the first one of the chat themes and the audio recordings associated with the first chat theme from storage and transmits to the second device the sample portion of the audio recording formatted to initiate the first one of the chat themes and the audio recordings associated with the first chat theme.

2. The system of claim 1, wherein the audible chat application further determines a ranking of the chat themes based on the audio recordings associated with each chat theme and causes a list of the chat themes to be displayed with an indication of the ranking of the chat themes.

3. The system of claim 2, wherein the ranking is based on at least one of the number of audio recordings associated with each chat theme, the rate at which additional audio recordings are associated with each chat theme over a time interval, and an average length of the audio recordings associated with each chat theme.

4. The system of claim 1, wherein the chat space application determines when interest in a first chat theme drops below a threshold interest level and removes the initiating audio recording that initiated the first chat theme and the other audio recordings associated with the first chat theme from the audible chat space.

5. The system of claim 1, wherein in response to receiving a request including at least one keyword from the first device, the chat space application searches the chat theme audio titles based on the at least one keyword and returns a list of chat themes to the first device that match the at least one keyword.

6. The system of claim 1, wherein the chat space application stores the audio recordings in one of on the computer system and in a database, and wherein the database stores profile information for participants of the audible chat space including technical capabilities of each participant's device used with the audible chat space.

7. The system of claim 6, wherein the chat space application deletes or truncates audio recordings that exceed a size threshold prior to their being posted to the audible chat space.

8. A method of providing an audible chat space, comprising:
   receiving a plurality of voice chat messages, each of the voice chat messages including a chat title, each chat title identifying a discussion thread of the audible chat space;
   discarding voice chat messages that exceed a maximum file size;
   storing voice chat messages that do not exceed the maximum file size;
   posting the voice chat messages that do not exceed the maximum file size to the audible chat space;
   for each chat title, determining a popularity of the chat title based on analyzing the stored voice chat messages that include the chat title;
   upon entry of a first device to the audible chat space, transmitting to the first device a preview portion of the discussion threads of the audible chat space;
   upon selection of a list of discussion threads by the first device, transmitting to the first device a text list of chat titles;
   upon selection of a discussion thread by the first device, transmitting to the first device the stored voice chat messages having the chat title that identifies the selected discussion thread; and
   enabling navigation of the chat themes by displaying a separate icon for each of the chat themes, signaling an activity level for each of the chat themes based on adjustable icon attributes, and presenting audio recordings posted for a chat theme in response to selection of a corresponding icon by a user.

9. The method of claim 8, wherein the relevance of the chat title is determined based on one of the number of chat messages associated with the chat title, the rate that chat messages associated with the chat title are stored, a number of different participants associated with the chat title, and an average size of the chat messages associated with the chat title.

10. The method of claim 8, wherein the text list of chat titles includes an indication of the popularity of each of the chat titles.

11. The method of claim 8, wherein the text list of chat titles are transmitted to the first device in order based on the popularity of each of the chat titles.

12. The method of claim 8, further including discarding a voice chat message associated with a restricted user.

13. The method of claim 8, wherein the preview portion of the discussion threads comprises a portion of each of the voice chat messages that initiate a discussion thread.

14. The method of claim 13, wherein the portion consists of a maximum of ten seconds for each of the voice chat messages that initiate a discussion thread.

15. A non-transitory computer-readable medium storing an audible chat space program for managing an audible chat space that, when executed by a processor, causes the processor to:
- receive a plurality of audio recordings, at least some of the audio recordings formatted to initiate one of a plurality of chat themes and the other audio recordings associated with one of the chat themes,
- post the plurality of audio recordings to the audible chat space;
- enable navigation of the chat themes by displaying a separate icon for each of the chat themes, signaling an activity level for each of the chat themes based on adjustable icon attributes, and presenting audio recordings posted for a chat theme in response to selection of a corresponding icon by a user,
- convert a chat theme audio title provided for each of the audio recordings formatted to initiate one of the chat themes to a chat theme text title,
- in response to receiving a request from a first device for a list of chat themes, transmit to the first device the chat theme text titles, and
- in response to receiving a request from a second device for a summary of a first one of the chat themes, transmit to the second device a sample portion of the audio recording formatted to initiate the first one of the chat themes and the audio recordings associated with the first chat theme.

16. The non-transitory computer-readable medium of claim 15, wherein the audible chat space program causes the processor to store received audio recordings which are limited to less than about a maximum size threshold.

17. The non-transitory computer-readable medium of claim 16, wherein the maximum size threshold is about sixty seconds.

18. The non-transitory computer-readable medium of claim 16, wherein the audible chat space program causes the processor to delete stored audio recordings associated with a chat theme that is determined to have less than a threshold amount of importance.

19. The non-transitory computer-readable medium of claim 18, wherein the importance of a chat theme is based on one of a most recent activity on the chat theme, a rate of activity on the chat theme, and a rate of requesting audio recordings from the chat theme.

20. The non-transitory computer readable medium of claim 15, wherein each sample portion comprises less than about a first ten seconds of its corresponding audio recording.

* * * * *